Patented Nov. 7, 1922.

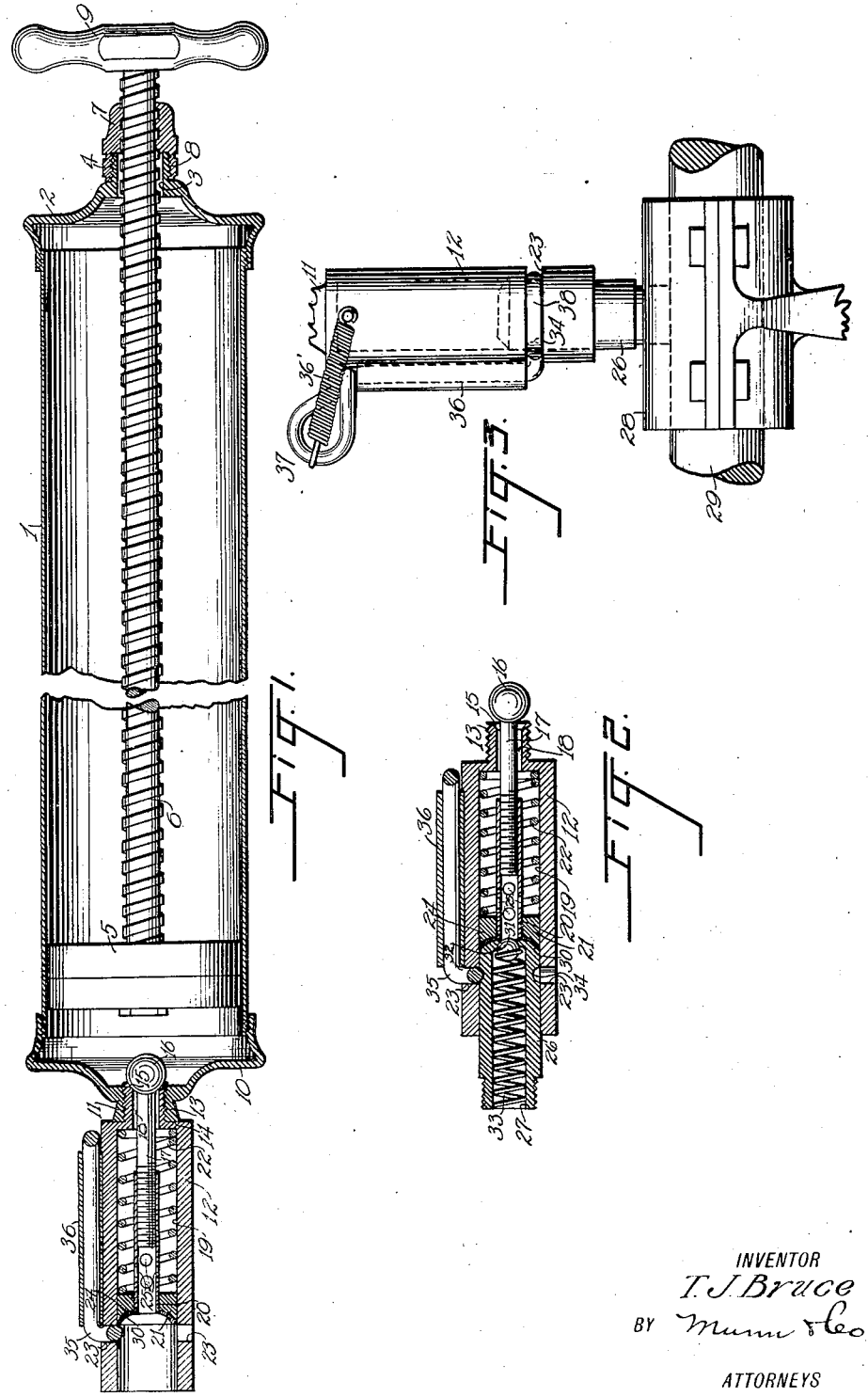

1,435,103

UNITED STATES PATENT OFFICE.

THOMAS J. BRUCE, OF CHICAGO, ILLINOIS.

LUBRICATING SYSTEM.

Application filed September 7, 1920. Serial No. 408,498.

*To all whom it may concern:*

Be it known that I, THOMAS J. BRUCE, a citizen of the United States, and a resident of Chicago, in the county of Cook and State of Illinois, have invented a new and useful Improvement in Lubricating Systems, of which the following is a full, clear, and exact description.

My invention relates to improvements in lubricating systems, and it consists in the combinations, constructions and arrangements herein described and claimed.

An object of my invention is to provide a lubricating system comprising a gun-like container for a lubricating substance and a lubricant holding member normally operatively attached to a journal or other bearing and adapted for engagement with the container to receive the lubricant ejected therefrom.

A further object of my invention is to provide a device of the type described having means for normally preventing the passage of the lubricating substance from the gun-like container, such means being arranged to be operated by the lubricant holding member when the latter is engaged by the gun-like container to permit the ejectment of lubricant from the latter at will.

A further object of my invention is to provide in a device of the type described a lubricant holding member adapted to function as a grease or oil cup and at the same time adapted to cooperate with the gun-like container in the device to permit the operation of the latter.

A further object of my invention is to provide a device of the type described that is relatively simple in construction and operation, not likely to get out of order easily, and thoroughly practical commercially.

Other objects and advantages will appear in the following specification, and the novel features of the invention will be particularly pointed out in the appended claims.

My invention is illustrated in the accompanying drawings, forming part of this application, in which is Figure 1 is a longitudinal section through a portion of the device, Figure 2 is a section through the nozzle portion of the device showing the detachable lubricant holding member of the device engaged thereby, Figure 3 is a view of a fragmentary portion of the device, showing the detachable lubricant holding member thereof applied to a bearing.

Referring now to Fig. 1 of the drawings it will be noted that I make use of a lubricant containing gun comprising a cylindrical barrel 1 provided at its rearward end with a knurled cap 2 formed with a central opening 3 therethrough and with an exteriorly threaded tubular extension 4.

A plunger 5 is mounted for reciprocation within the cylindrical barrel 1 and is provided with a threaded rod 6 that extends through the opening 3, being loosely received therein. A retaining nut 7 screwing on the threaded rod 6 has its bore enlarged and threaded interiorly at 8 for engagement with the threaded tubular extension 4, wherefore the plunger 5 must be actuated by rotating the threaded rod 6 when the tubular extension 4 is engaged by the nut 7 but may be actuated by a straight forward or backward movement of the rod 6 when the nut 7 has been moved out of engagement with the tubular extension 4. A handle 9 is provided for operating the rod 6.

The parts described so far are ordinary in construction and form no part of my invention except in so far as they cooperate with the parts about to be described.

The forward end of the cylindrical barrel 1 is provided with a cap 10 extended centrally to form an interiorly threaded tubular extension 11. A nozzle 12 has its inner end reduced and threaded at 13 to form a nipple for screwing in the threaded tubular extension 11, thereby defining a shoulder 14 against which the outer end of the extension 11 abuts while the inner end of the nipple is flush with the inner wall of the cap 10 and is beveled at 15 to provide a seat for a ball valve 16.

The ball valve 16 is formed integrally with or secured rigidly to a rod 17 that extends through the bore 18 of the nipple 13 into the chamber or bore 19 of the nozzle 12 and is secured to the inner end of a tubular member 20 in any suitable manner as by threaded engagement therewith. It will be noted that the bore 18 is larger in diameter than the rod 17, providing an annular space between the latter and the inner wall of the nipple 13 while the tubular member 20 which has a diameter considerably less than the inner diameter of the nozzle 12 is spaced from the inner wall of the latter by a packing member 21 that is mounted on the outer end of the rod and arranged for slidable movement within the bore or chamber 19. A spring 22, that is mounted upon the tubular member 20 to have one end pressing against the inner side of the packing member 21 while the other end thereof presses against the inner forward end wall of the nozzle 12, normally holds the ball valve 16 against its seat thereby preventing the ejection of a lubricant from the gun.

At this time the packing member 21 is positioned slightly to the rear of a transverse slot 23 that is formed through the wall of the nozzle 12 and extends approximately half way around the same as shown.

The outer side of the packing member 21 is concaved at 24 in the form of the device now preferred by me. The tubular member 20 is provided with a plurality of openings 25 through its wall adjacent the outer end thereof.

A lubricant holding member which functions as a lubricating cup and will be so referred to hereinafter in this specification comprises a cylinder or tube 26 providing a chamber 27 and threaded at one end for operative engagement with a journal or other bearing 28 that may be provided for a shaft, axle, or the like 29. The other end of the tube or cylinder has an inwardly extending concavo-convex flange 30 that has its inner or concave side beveled at 31 to provide a seat for a ball valve 32 that is held on its seat normally by a spring 33 disposed with the chamber 27.

From the foregoing description of the various parts of the device, the operation thereof may be readily understood. It will be understood that a plurality of the lubricating cups described are provided, such cups being available for replacement or positioned in the bearings of a vehicle or other device and performing the ordinary functions of a lubricating cup in addition to operating in a manner to be set forth hereinafter.

When it is desired to fill any one of such lubricating cups the outer or forward end of the nozzle 12 is projected over the outer end of the lubricating cup. The convex outer surface of the lubricating cup contacts with the concave surface of the packing member 21 and moves the latter inwardly until an annular groove 34 in the cylinder or tube 26 at a spaced distance from the inner end thereof registers with the slot 23. A wire 35 having spring qualities has a portion of its length rotatably disposed in a sleeve 36 that is secured to the outer wall of the nozzle 12 and parallel therewith. The outer end of the wire 35 is bent at 38 to conform with the curvature of the groove 34 in the cylinder or tube 26 and is arranged to enter the slot 23 into engagement with the walls of the groove 34 to maintain the oil cup within the nozzle 12. A spring 36', that has one end secured to the wall of the nozzle while the other end thereof is secured to the inner end of the wire 35 which may be bent to form a handle 37, holds the wire 35 in engagement with the oil cup, wherefore the latter is held in the position shown in Fig. 2.

The ball valve 16 has now been moved inwardly from its seat and is so held by the engagement of the end of the oil cup with the packing member 21.

The plunger 5 is then actuated in the ordinary manner to force the lubricating substance from the barrel 1 into the chamber 19 of the nozzle. When the chamber 19 is filled, further operation of the plunger 5 will force the lubricating substance through the openings 25 into the tubular member 20 against the ball valve 31 that normally closes the mouth of the lubricating cup. As the operation is continued, the ball valve 31 will be moved from its seat and the lubricating substance will be forced into the lubricating cup, filling the latter.

The handle 37 may be operated by pressure of the thumb of the operator who is grasping the lubricating gun, the lubricating cup released, and the nozzle withdrawn from engagement with the oil cup. The packing member 21 will follow the convex end of the oil cup during the disengaging process and is in effect a piston, being actuated by the spring 22, until the ball valve 16 is seated in the outlet orifice of the lubricating gun, thereby automatically closing the same and preventing loss and waste of the lubricant.

The device provides a simple and effective means for filling the lubricating cups quickly and readily without waste of the lubricating substance and without the necessity of using any tools whatsoever. The lubricating cups are simple in construction and feed the lubricant to the bearings as required without permitting any of the contents of the cups to be spilled therefrom.

I claim:

1. In a lubricating system, a nozzle adapted at one end to receive a tubular oil receptacle and at its other end for engagement with a lubricating gun, said nozzle being provided with a transverse slot in its wall adjacent to the first named end thereof and extending approximately half way around the nozzle, a longitudinally disposed sleeve secured to said nozzle, a wire member rotatably mounted in said sleeve and being formed adjacent to one end into a semi-circular hook adapted to enter the slot in the wall of said nozzle and to frictionally engage the said tubular receptacle, and means for normally holding said semi-circular hook in engagement with the tubular receptacle.

2. In a lubricating system, a receptacle formed with an annular groove in its outer wall adjacent to the outer end thereof, and means for detachably coupling the receptacle to a lubricating gun, said means comprising a nozzle formed with a transverse slot in its outer wall adjacent to the outer end thereof and extending approximately half way around said nozzle, a longitudinally disposed sleeve secured to said nozzle, a wire member rotatably mounted in said sleeve and having its inner end bent transversely and formed into a semi-circular hook adapted to enter the slot in the wall of said nozzle, and means for normally holding said semi-circular hook in engagement with the groove in the wall of said receptacle.

3. In a lubricating system, a receptacle formed with an annular groove in its outer wall adjacent to the outer end thereof, and means for detachably coupling the receptacle to a lubricating gun, said means comprising a nozzle formed with a transverse slot in its outer wall adjacent to the outer end thereof and extending approximately half way around said nozzle, a longitudinally disposed sleeve secured to said nozzle, a wire member rotatably mounted in said sleeve and having its inner end bent transversely and formed into a semi-circular hook adapted to enter the slot in the wall of said nozzle, and spring means for normally holding said semi-circular hook in engagement with the groove in the wall of said receptacle.

4. In a lubricating device, a tubular receptacle formed with an annular groove in its outer wall adjacent to the outer end thereof, and means for detachably coupling the receptacle to a lubricating gun and means for controlling the passage of a lubricant from the lubricating gun into the receptacle, said means comprising a tubular nozzle adapted at one end to engage with a lubricating gun and at its other end to receive the outer end portion of the receptacle, said nozzle being formed with a transverse slot in its wall adjacent to the outer end thereof, means carried by the nozzle and arranged to normally enter the slot to engage with the groove in the said receptacle, said means being operable at will to disengage the groove in the receptacle, a ball valve seated against the first named end of said nozzle, a valve stem rigidly connected to said ball valve and arranged to extend within the nozzle, a tubular member rigidly mounted upon the outer end of said valve stem and having its open outer end projecting therebeyond, said tubular member being formed with a plurality of perforations through its wall, a packing member rigidly mounted upon said last named tubular member adjacent to the outer end thereof and arranged for slidable movement in the nozzle, and spring means mounted upon said valve stem and reacting against said packing member to urge the latter toward the outer end of said nozzle, whereby said ball valve is normally maintained on its seat.

THOMAS J. BRUCE.